(12) United States Patent
Kuo (10) Patent No.: US 7,121,391 B2
(45) Date of Patent: Oct. 17, 2006

(54) ONE-WAY CLUTCH

(75) Inventor: Ying-Hsien Kuo, Taipei (TW)

(73) Assignee: BENQ Corporation, Taoyuan (TW)

( * ) Notice: Subject to any disclaimer, the term of this patent is extended or adjusted under 35 U.S.C. 154(b) by 105 days.

(21) Appl. No.: 10/974,402

(22) Filed: Oct. 27, 2004

(65) Prior Publication Data

US 2005/0092572 A1   May 5, 2005

(30) Foreign Application Priority Data

Oct. 31, 2003  (TW) .............................. 92219379 U (51) Int. Cl.
*F16D 41/066* (2006.01)
(52) U.S. Cl. ...................... 192/45; 192/89.1
(58) Field of Classification Search .................. 192/45, 192/64, 89.1
See application file for complete search history.

(56) References Cited

U.S. PATENT DOCUMENTS

| 677,276 | A | * | 6/1901 | Robertson | 74/141 |
| 1,857,252 | A | * | 5/1932 | Miller et al. | 188/30 |
| 2,017,132 | A | * | 10/1935 | Ricci | 340/404.2 |
| 3,844,392 | A | | 10/1974 | Stroezel | |
| 5,471,890 | A | * | 12/1995 | Shiga et al. | 74/7 E |
| 5,558,193 | A | * | 9/1996 | Jenkins et al. | 192/45 |
| 2002/0157916 | A1 | * | 10/2002 | Lew et al. | 192/64 |

FOREIGN PATENT DOCUMENTS

| CN | 87106225 A | | 3/1988 |
| CN | 1119244 A | | 3/1996 |
| JP | 60125420 A | * | 7/1985 |

* cited by examiner

*Primary Examiner*—Richard M. Lorence
(74) *Attorney, Agent, or Firm*—Quintero Law Office (57) ABSTRACT

A one-way clutch. The one-way clutch includes a passive member, an active member, and a rolling member. The passive member has an outer circumferential surface and a sliding portion. The sliding portion extends from the outer circumferential surface to the interior of the passive member and has a first plane surface and a second plane surface. The first plane surface is opposite to the second plane surface. The first plane surface is not parallel to the second plane surface. The active member is disposed on the outer circumferential surface of the passive member and has an inner circumferential surface and an engaging portion. The inner circumferential is surface is in slidable contact with the outer circumferential surface of the passive member. The engaging portion extends from the inner circumferential surface to the interior of the active member. The rolling member rolls and slides between the sliding portion and the engaging portion.

12 Claims, 8 Drawing Sheets

ONE-WAY CLUTCH

BACKGROUND OF THE INVENTION

1. Field of the Invention

The present invention relates to a one-way clutch, and in particular to a one-way clutch that has a simplified structure and enhances transmission thereof.

2. Description of the Related Art

A one-way clutch generally transmits a mechanism in a single direction and rotates without transmission in the opposite direction.

Figure 1:
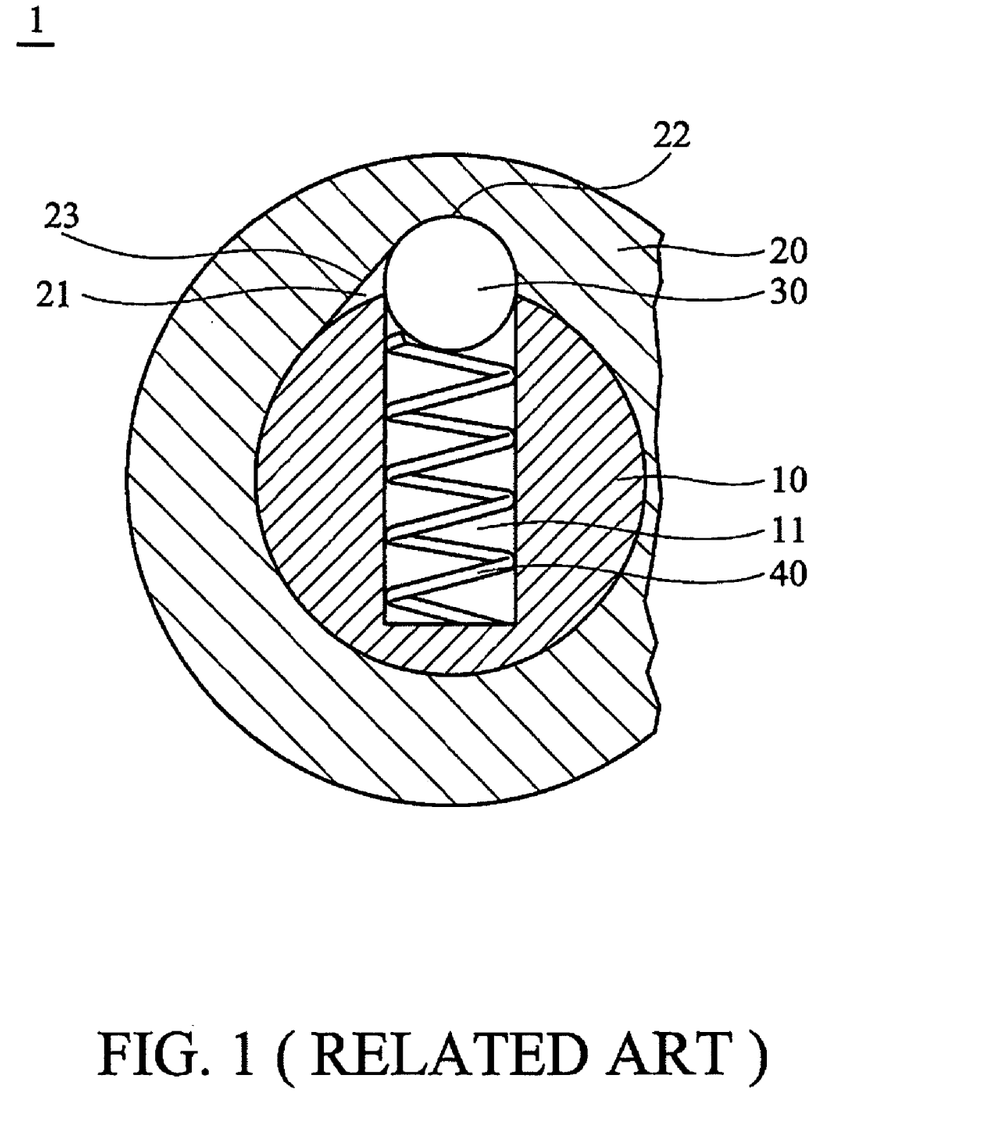
FIG. 1 is a schematic cross section of a conventional one-way clutch.

Referring to FIG. 1, U.S. Pat. No. 3,844,392 discloses a conventional one-way clutch 1 having the aforementioned function. The one-way clutch 1 includes a passive member 10, an active member 20, a roller 30 and a spring 40. The passive member 10 includes a receiving portion 11 formed therein. The active member 20 includes an engaging groove 21 formed therein. The spring 40 is disposed in the receiving portion 11. The roller 30 is disposed on the spring 40 and in the receiving portion 11. The spring 40 provides an axial force to the roller 30. Additionally, the engaging groove 21 includes a curved surface 22 and a slanted surface 23.

As shown in FIG. 1, when the active member 20 rotates counterclockwise, the roller 30 is driven by the curved surface 22 of the engaging groove 21, thus causing the passive member 10 to rotate counterclockwise. At this point, the one-way clutch 1 performs one-way transmission. When the active member 20, on the other hand, rotates clockwise, the roller 30 slides on the slanted surface 23 of the engaging groove 21 and compresses the spring 40. The roller 30 is then pushed into the receiving portion 11 of the passive member 10, causing the active member 20 to slide on the outer circumferential surface of the passive member 10 and on the roller 30. At this point, the one-way clutch 1 only rotates and does not perform any transmission.

The conventional one-way clutch 1 has many drawbacks as follows.

Since the spring 40 is disposed in the passive member 10, manufacture of the one-way clutch 1 is difficult, increasing manufacturing costs thereof.

The active member 20 has only one engaging groove 21. When the one-way clutch 1 performs transmission, the active member 20 may require a large amount of rotation to position the roller 30 into the engaging groove 21. Accordingly, the length of time the roller 30 contacts the active member 20 is long. Additionally, the operation generates noise.

Accordingly, since the active member 20 may require a large amount of rotation to position the roller 30 into the engaging groove 21, transmission efficiency of the one-way clutch 1 is reduced.

SUMMARY OF THE INVENTION

Accordingly, an object of the invention is to provide a one-way clutch to overcome the aforementioned problems. The one-way clutch comprises a passive member, an active member and a rolling member. The passive member has an outer circumferential surface and a sliding portion. The sliding portion extends from the outer circumferential surface to the interior of the passive member and has a first plane surface and a second plane surface opposite thereto. The first and second plane surfaces tilt toward each other in a convergent manner and extend to the interior of the passive member from the outer circumferential surface at an inclined angle. The active member is slidably disposed on the outer circumferential surface of the passive member and has an inner circumferential surface and an engaging portion. The inner circumferential surface is in slidable contact with the outer circumferential surface of the passive member. The engaging portion extends from the inner circumferential surface to the interior of the active member. The rolling member rolls and slides between the sliding portion and the engaging portion. The difference between the maximum distance from the engaging portion of the active member to the center of the passive member and the radius of the passive member is less than the diameter of the rolling member.

The engaging portion of the active member further comprises a curved surface and a slanted surface connected to the curved surface. The length of the curved surface is less than the length of the slanted surface. The rolling member abuts the curved surface or slides on the slanted surface.

The engaging portion of the active member further comprises a first slanted surface and a second slanted surface connected to the first slanted surface. The length of the first slanted surface is less than the length of the second slanted surface. The rolling member abuts the first slanted surface or slides on the second slanted surface.

The engaging portion of the active member further comprises a first curved surface and a second curved surface connected to the first curved surface. The length of the first curved surface is less than the length of the second curved surface. The rolling member abuts the first curved surface or slides on the second curved surface.

The inclined angle is between 5° and 85°.

The rolling member is a ball.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 2A:
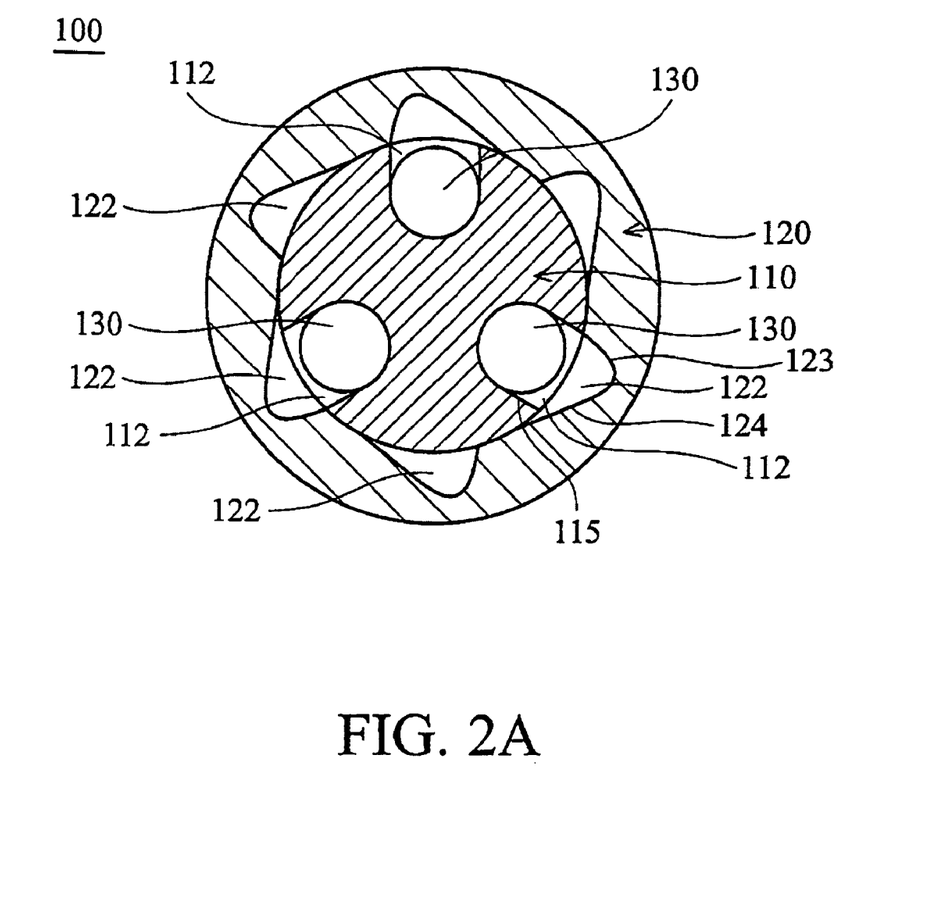
FIG. 2A is a schematic cross section of the one-way clutch of the first embodiment of the invention.

Referring to FIG. 2A, the one-way clutch 100 of this embodiment comprises a passive member 110, an active member 120 and three rolling members 130.

Figure 3A:
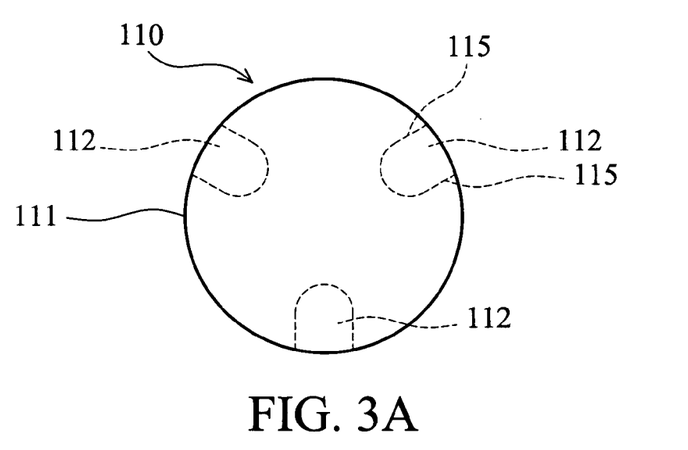
FIG. 3A is a schematic top view of the passive member of the first embodiment of the invention.

Referring to FIG. 3A, the passive member 110 has an outer circumferential surface 111 and three sliding portions 112 uniformly distributed thereon. Each sliding portion 112 extends from the outer circumferential surface 111 to the interior of the passive member 110.

Figure 3B:
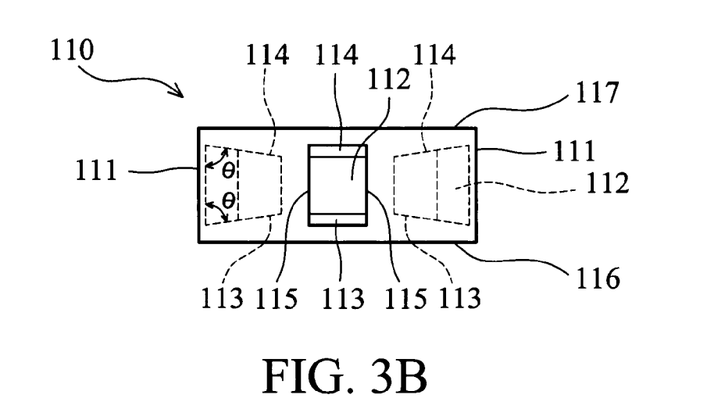
FIG. 3B is a schematic front view according to FIG. 3A.
Figure 3C:
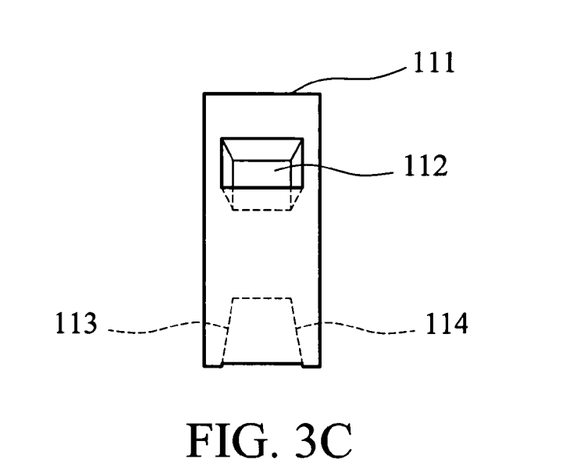
FIG. 3C is a schematic side view according to FIG. 3A.

Referring to FIG. 3B and FIG. 3C, the sliding portions 112 have the same shape and are recesses with an approximately tapered cross section. Specifically, each sliding portion 112 has a first plane surface 113 and a second plane surface 114 opposite thereto. The first plane surface 113 and second plane surface 114 respectively tilt toward the bottom 116 and top 117 of the passive member 110 from the interior thereof. Namely, the first plane surface 113 and second plane surface 114 tilt toward each other in a convergent manner and extend to the interior of the passive member 110 from the outer circumferential surface 111 thereof at an inclined angle θ. The inclined angle θ may vary from 5° to 85°.

Figure 4:
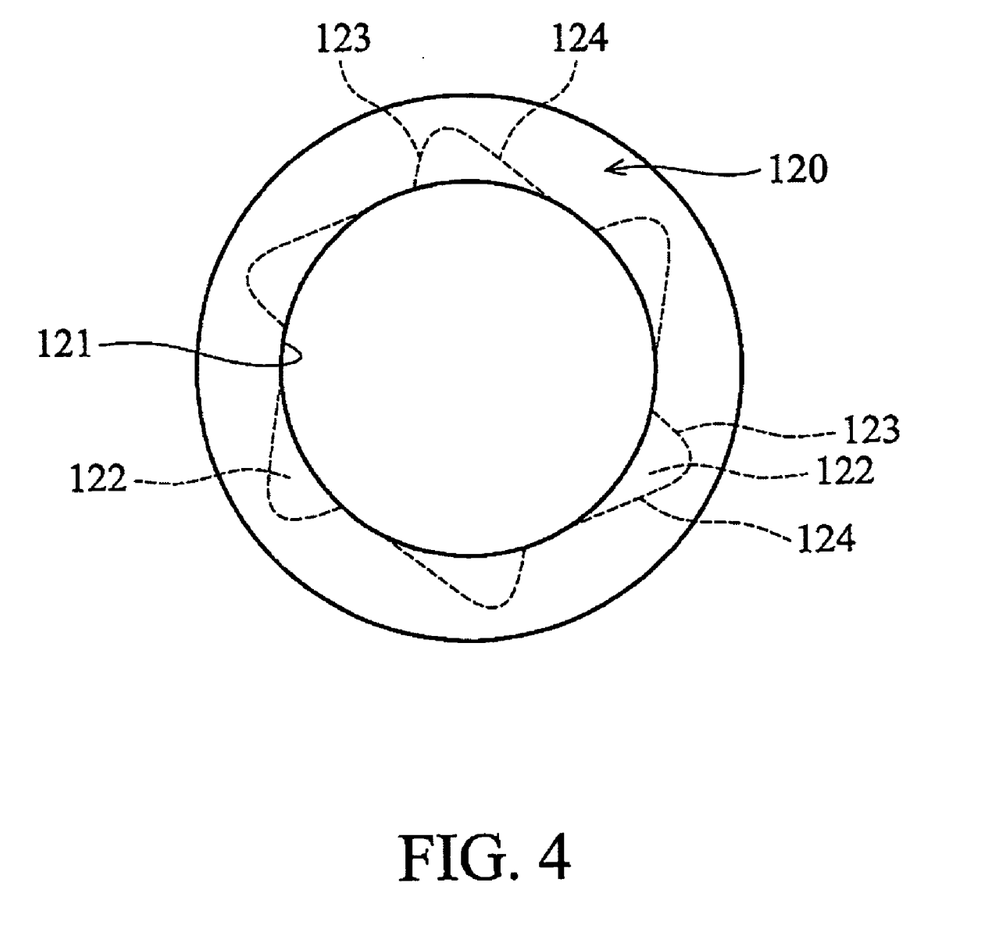
FIG. 4 is a schematic top view of the active member of the one-way clutch of the invention.

As shown in FIG. 2A and FIG. 4, the active member 120 is slidably disposed on the outer circumferential surface 111 of the passive member 110 and has an inner circumferential surface 121 and six engaging portions 122 uniformly distributed thereon. As shown in FIGS. 2A, 3A and 4, the inner circumferential surface 121 of the active member 120 is in slidable contact with the outer circumferential surface 111 of the passive member 110. As shown in FIG. 4, each engaging portion 122 of the active member 120 extends from the inner circumferential surface 121 to the interior of the active member 120. Additionally, each engaging portion 122 comprises a curved surface 123 and a slanted surface 124 connected to the curved surface 123. Specifically, the length of the curved surface 123 is less than the length of the slanted surface 124. The curved surface 123 and slanted surface 124 thus form the shape of the engaging portion 122, as shown in FIG. 4.

The rolling members 130 of this embodiment are balls. Each rolling member 130 can roll and slide between the sliding portion 112 and the engaging portion 122. Specifically, the difference between the maximum distance from each engaging portion 122 of the active member 120 to the center of the passive member 110 and the radius of the passive member 110 is less than the diameter of each rolling member 130. The rolling members 130 thus cannot randomly roll between the sliding portions 112 and the engaging portions 122 due to insufficient radius thereof.

As shown in FIG. 2A and FIG. 3C, after the passive member 110, active member 120 and rolling members 130 are assembled to form the one-way clutch 100, the one-way clutch 100 can perform transmission in a direction (clockwise) and rotate without transmission in the opposite direction (counterclockwise) regardless of whether the one-way clutch 100 is placed vertically or horizontally. Specifically, when the active member 120 rotates clockwise, the rolling members 130 roll or slide into the engaging portions 122 of the active member 120 along the inclined first plane surface 113 or second plane surface 114 by gravity. Because of retardation of the curved surface 123 of each engaging portion 122 and side wall 115 of each sliding portion 112, the rolling members 130 and passive member 110 are driven by the active member 120 to rotate clockwise. At this point, the one-way clutch 100 performs transmission. When the active member 120, on the other hand, rotates counterclockwise, the rolling members 130 are pushed into the sliding portions 112 of the passive member 110 by the slanted surface 124 of each engaging portion 122. The active member 120 then slides on the outer circumferential surface 111 of the passive member 110 and on the rolling members 130. At this point, the one-way clutch 100 only rotates and does not perform any transmission.

Specifically, the one-way clutch 100 is not limited to having three rolling members 130 and three sliding portions 112. Namely, the one-way clutch 100 may have only one rolling member 130 and one sliding portion 112. Accordingly, when the active member 120 rotates counterclockwise, noise resulting from the active member 120 sliding on the outer circumferential surface 111 of the passive member 110 and on the rolling members 130 can be reduced. Similarly, the one-way clutch 100 may have more than six engaging portions 122, such that the rotating angle of the active member 120 for which the rolling members 130 engage the engaging portions 122 can be reduced.

Figure 2B:
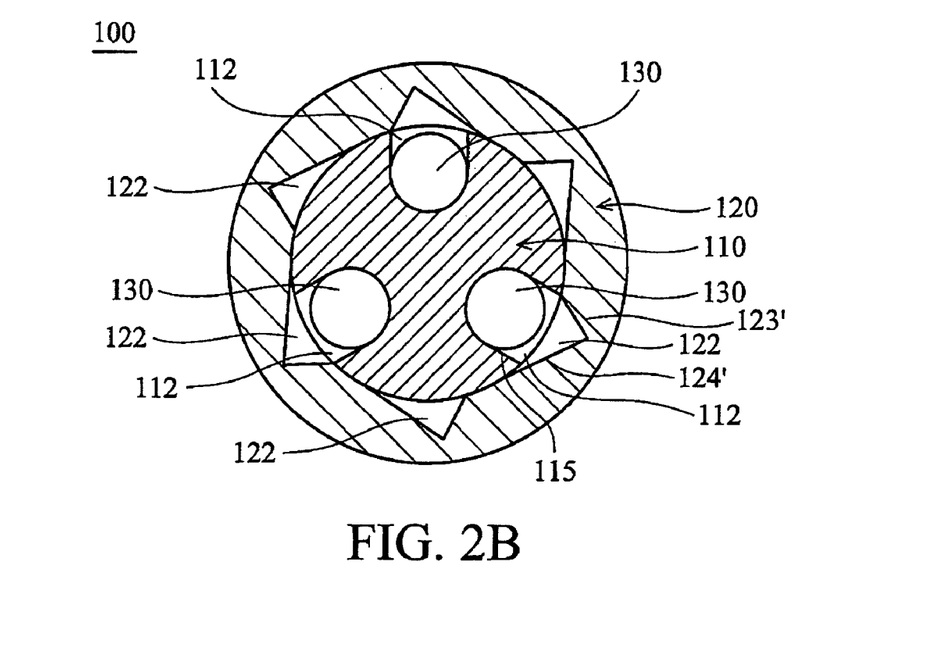
FIG. 2B is a variant embodiment of FIG. 2A.

Moreover, the curved surface 123 and slanted surface 124 of each engaging portion 122 may be a first slanted surface 123' and a second slanted surface 124', respectively (as shown in FIG. 2B). Similarly, the first slanted surface 123' is connected to second slanted surface 124' and the length of the first slanted surface 123' is less than the length of the second slanted surface 124'. Thus, the rolling member 130 can be retarded by the first slanted surface 123' or slide on the second slanted surface 124'.

Figure 2C:
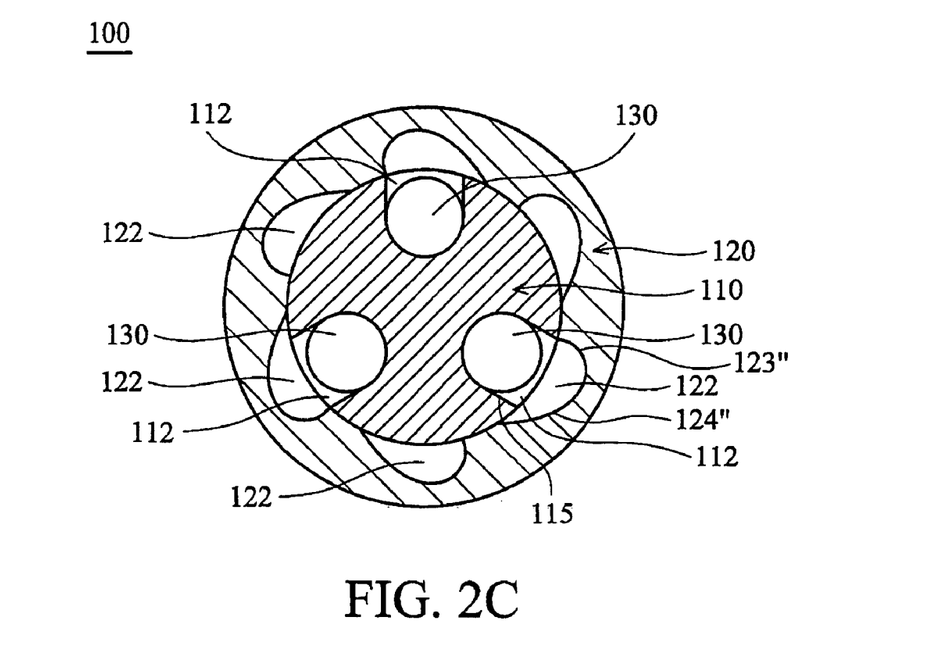
FIG. 2C is another variant embodiment of FIG. 2A.

Similarly, the curved surface 123 and slanted surface 124 of each engaging portion 122 may be a first curved surface 123" and a second curved surface 124", respectively (as shown in FIG 2C). Similarly, the first curved surface 123" is connected to the second curved surface 124" and the length of the first curved surface 123" is less than the length of the second curved surface 124". Thus, the rolling member 130 can be retarded by the first curved surface 123" or slide on the second curved surface 124".

Second Embodiment

Figure 5A:
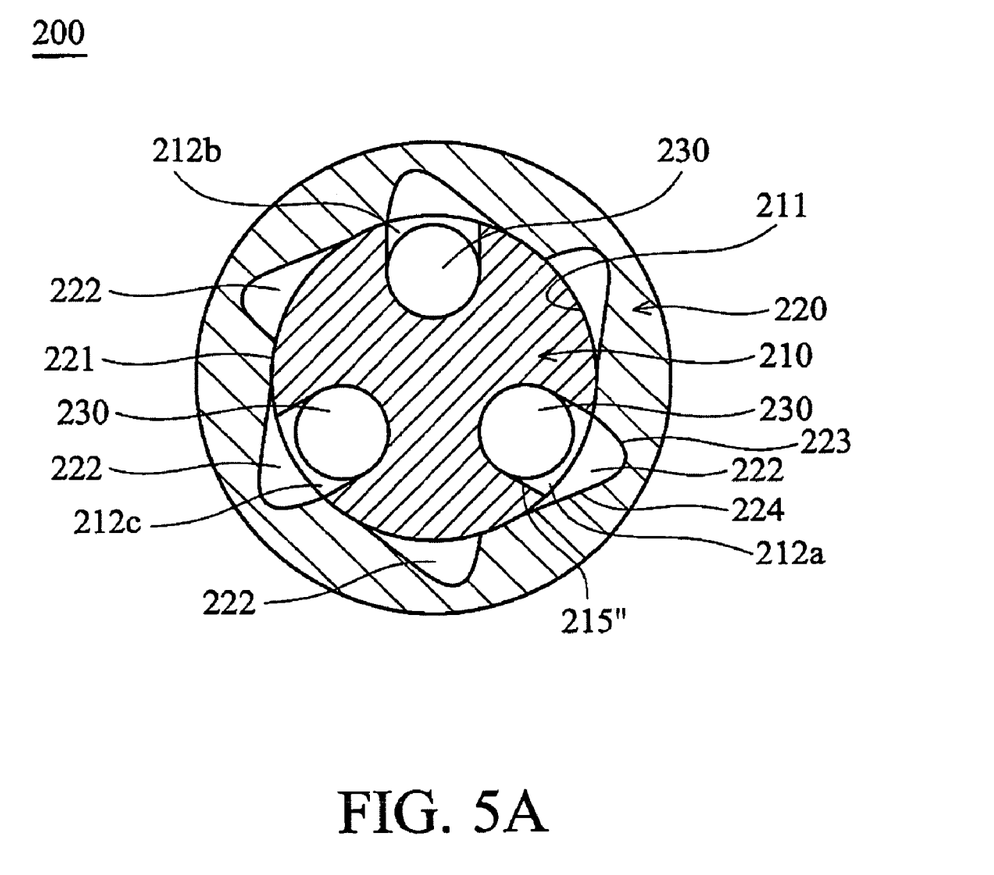
FIG. 5A is a schematic cross section of the one-way clutch of the second embodiment of the invention.

Referring to FIG. 5A, the one-way clutch 200 of this embodiment comprises a passive member 210, an active member 220 and three rolling members 230.

Figure 6A:
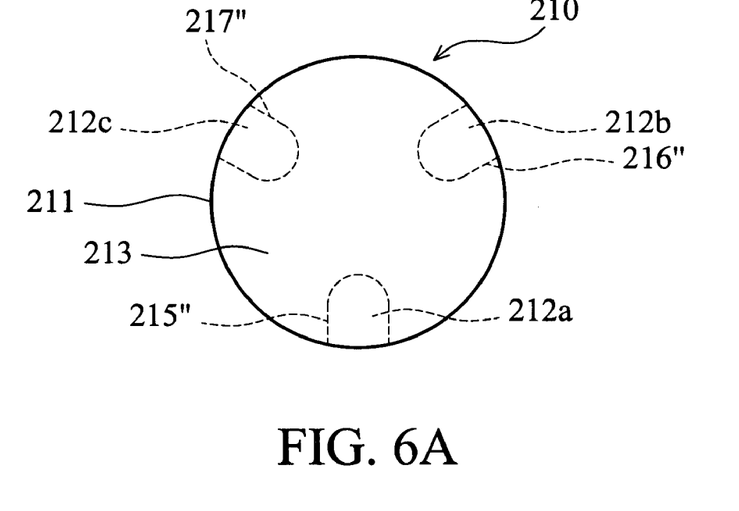
FIG. 6A is a schematic top view of the passive member of the second embodiment of the invention.

Referring to FIG. 6A, the passive member 210 has an outer circumferential surface 211 and a first sliding portion 212a, a second sliding portion 212b and a third sliding portion 212c. The first sliding portion 212a, second sliding portion 212b and third sliding portion 212c are uniformly distributed on the passive member 210 and extend from the outer circumferential surface 211 to the interior of the passive member 210.

Figure 6B:
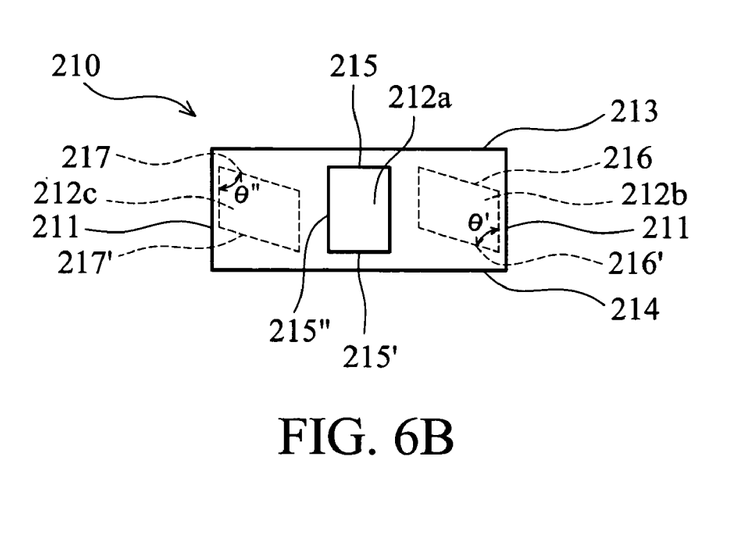
FIG. 6B is a schematic front view according to FIG. 6A.

Referring to FIG. 6B, the first sliding portion 212a is a horizontal recess. Namely, the first sliding portion 212a has a first plane surface 215 and a second plane surface 215' parallel thereto. Additionally, the first plane surface 215 and second plane surface 215' are parallel to the top 213 and bottom 214 of the passive member 210, respectively. The second sliding portion 212b extends to the interior of the passive member 210 from the outer circumferential surface 211 at an inclined angle θ'. Namely, the second sliding portion 212b is a recess tilting toward the bottom 214 of the passive member 210 from the interior thereof. Specifically, the second sliding portion 212b has a third plane surface 216 and a fourth plane surface 216' parallel thereto. The third plane surface 216 and fourth plane surface 216' tilt toward the top 213 and bottom 214 of the passive member 210, respectively. The third sliding portion 212c extends to the interior of the passive member 210 from the outer circumferential surface 211 at an inclined angle θ". Namely, the third sliding portion 212c is a recess tilting toward the top 213 of the passive member 210 from the interior thereof. Specifically, the third sliding portion 212c has a fifth plane surface 217 and a sixth plane surface 217' parallel thereto. The fifth plane surface 217 and sixth plane surface 217' tilt toward the top 213 and bottom 214 of the passive member 210, respectively. The inclined angles (θ' and θ") may vary from 5° to 85° and may be the same or different.

As shown in FIG. 5A, the active member 220 is slidably disposed on the outer circumferential surface 211 of the passive member 210 and has an inner circumferential surface 221 and six engaging portions 222 uniformly distributed thereon. The inner circumferential surface 221 of the active member 220 is in slidable contact with the outer circumferential surface 211 of the passive member 210. Each engaging portion 222 of the active member 220 extends from the inner circumferential surface 221 to the interior of the active member 220. Additionally, each engaging portion 222 comprises a curved surface 223 and a slanted surface 224 connected to the curved surface 223. Specifically, the length of the curved surface 223 is less than the length of the slanted surface 224. The curved surface 223 and slanted surface 224 thereby form the shape of the engaging portion 222, as shown in FIG. 5A.

The rolling members 230 of this embodiment are balls. Each rolling member 230 rolls and slides between the first sliding portion 212a and the engaging portion 222, between the second sliding portion 212b and the engaging portion 222, or between the third sliding portion 212c and the engaging portion 222. Specifically, the difference between the maximum distance from each engaging portion 222 of the active member 220 to the center of the passive member 210 and the radius of the passive member 210 is less than the diameter of each rolling member 230. Each rolling member 230 is thus unable to roll randomly between the first sliding portion 212a and the engaging portion 222, between the second sliding portion 212b and the engaging portion 222, or between the third sliding portion 212c and the engaging portion 222 due to insufficient radius thereof.

As shown in FIGS. 5A, 6A and 6B, after the passive member 210, active member 220 and rolling members 230 are assembled to form the one-way clutch 200, the one-way clutch 200 can perform transmission in a direction (clockwise) and rotate without transmission in the opposite direction (counterclockwise) regardless of whether the one-way clutch 200 is placed vertically or horizontally. Specifically, when the one-way clutch 200 is placed vertically and the active member 220 rotates clockwise, one of the rolling members 230 rolls or slides into one of the engaging portions 222 of the active member 220 from the first sliding portion 212a by gravity. Due to retardation of the curved surface 223 of the engaging portion 222 and side wall 215" of the first sliding portion 212a, the rolling member 230 and passive member 210 are driven by the active member 220 to rotate clockwise. At this point, the one-way clutch 200 performs transmission. When the one-way clutch 200 is placed horizontally, the top 213 of the passive member 210 thereof faces upward and the active member 220 rotates clockwise, one of the rolling members 230 rolls or slides into one of the engaging portions 222 of the active member 220 from the second sliding portion 212b by gravity. Due to retardation of the curved surface 223 of the engaging portion 222 and side wall 216" of the second sliding portion 212b, the rolling member 230 and passive member 210 are driven by the active member 220 to rotate clockwise. At this point, the one-way clutch 200 performs transmission. When the one-way clutch 200 is placed horizontally, the bottom 214 of the passive member 210 thereof faces upward and the active member 220 rotates clockwise, one of the rolling members 230 rolls or slides into one of the engaging portions 222 of the active member 220 from the third sliding portion 212c by gravity. Due to retardation of the curved surface 223 of the engaging portion 222 and side wall 217" of the third sliding portion 212c, the rolling member 230 and passive member 210 are driven by the active member 220 to rotate clockwise. At this point, the one-way clutch 200 performs transmission. When the active member 220, on the other hand, rotates counterclockwise, the rolling members 230 are pushed into first sliding portion 212a, second sliding portion 212b and third sliding portion 212c of the passive member 210 by the slanted surface 224 of each engaging portion 222. The active member 220 then slides on the outer circumferential surface 211 of the passive member 210 and on the rolling members 230. At this point, the one-way clutch 200 only rotates and does not perform any transmission.

Specifically, the one-way clutch 200 may have more than six engaging portions 222, such that the rotating angle of the active member 220 for which the rolling members 230 engage the engaging portions 222 can be reduced.

Figure 5B:
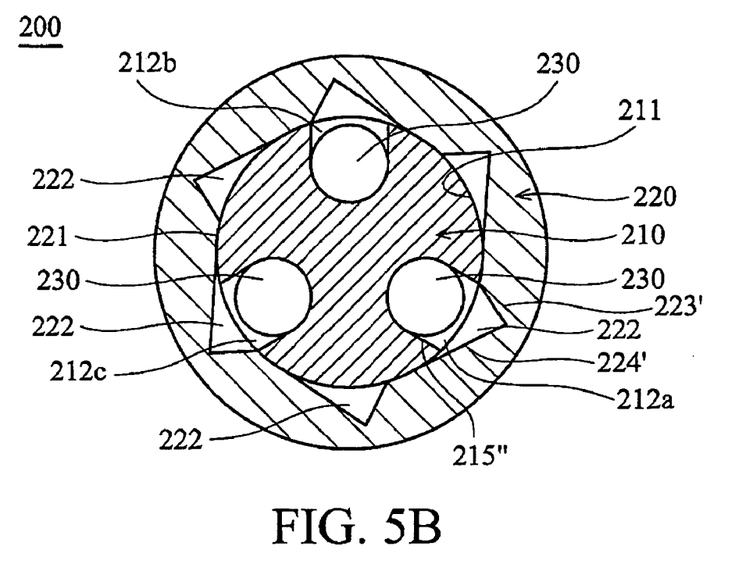
FIG. 5B is a variant embodiment of FIG. 5A.

Similarly, the curved surface 223 and slanted surface 224 of each engaging portion 222 may be a first slanted surface 223' and a second slanted surface 224', respectively (as shown in FIG. 5B). Similarly, the first slanted surface 223' is connected to the second slanted surface 224' and the length of the first slanted surface 223' is less than the length of the second slanted surface 224'. Thus, the rolling member 230 can be retarded by the first slanted surface 223' or slide on the second slanted surface 224'.

Figure 5C:
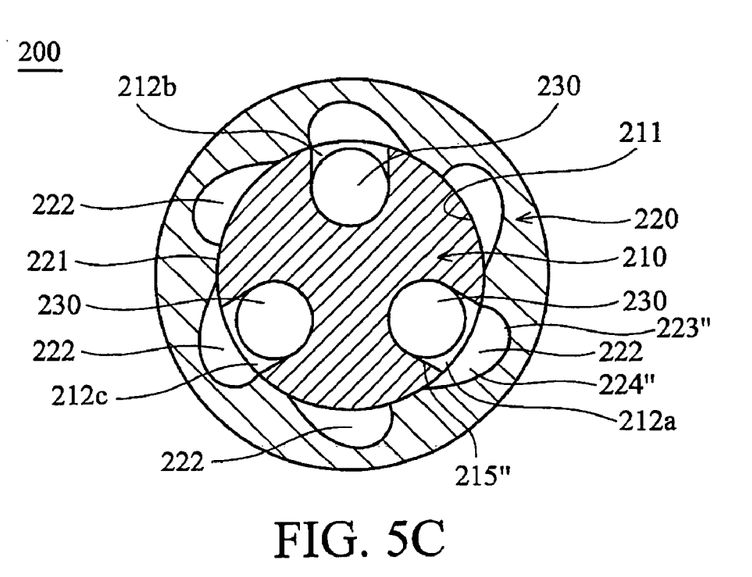
FIG. 5C is another variant embodiment of FIG. 5A.

Similarly, the curved surface 223 and slanted surface 224 of each engaging portion 222 may be a first curved surface 223" and a second curved surface 224", respectively (as shown in FIG. 5C). Similarly, the first curved surface 223" is connected to the second curved surface 224" and the length of the first curved surface 223" is less than the length of the second curved surface 224". Thus, the rolling member 230 can be retarded by the first curved surface 223" or slide on the second curved surface 224".

To conclude, the one-way clutch of the invention provides the following advantages.

The structure of the present one-way clutch is simplified, hence, manufacture thereof is easy and inexpensive. Additionally, since the angle of rotation of the active member is reduced, the amount of time the rolling members contact the inner circumferential surface of the active member is also reduced, thereby minimizing noise generated during operation of the present one-way clutch.

Accordingly, since the angle of rotation of the active member for which the rolling members engage the engaging portions is reduced, transmission efficiency of the present one-way clutch is enhanced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A one-way clutch, comprising:
a passive member, with an outer circumferential surface, a top surface and a sliding portion, wherein the sliding portion extends from the outer circumferential surface to the interior of the member and has a first plane surface, not perpendicular to the top surface, and a second plane surface opposite thereto, and the first and second plane surfaces tilt toward each other in a convergent manner and extend to the interior of the passive member from the outer circumferential surface at an inclined angle;
an active member slidably disposed on the outer circumferential surface of the passive member and having an inner circumferential surface and an engaging portion, wherein the inner circumferential surface is in slidable contact with the outer circumferential surface of the passive member, and the engaging portion extends from the inner circumferential surface to the interior of the active member; and
a rolling member rolling and sliding between the sliding portion and the engaging portion, wherein the difference between the maximum distance from the engaging portion of the active member to the center of the passive member and the radius of the passive member is less than the diameter of the rolling member.

2. The one-way clutch as claimed in claim 1, wherein the engaging portion of the active member further comprises a curved surface and a slanted surface connected to the curved surface, the length of the curved surface is less than the length of the slanted surface, and the rolling member abuts the curved surface or slides on the slanted surface.

3. The one-way clutch as claimed in claim 1, wherein the engaging portion of the active member further comprises a first slanted surface and a second slanted surface connected to the first slanted surface, the length of the first slanted surface is less than the length of the second slanted surface, and the rolling member abuts the first slanted surface or slides on the second slanted surface.

4. The one-way clutch as claimed in claim 1, wherein the engaging portion of the active member further comprises a first curved surface and a second curved surface connected to the first curved surface, the length of the first curved surface is less than the length of the second curved surface, and the rolling member abuts the first curved surface or slides on the second curved surface.

5. The one-way clutch as claimed in claim 1, wherein the inclined angle is between 5° and 85°.

6. The one-way clutch as claimed in claim 1, wherein the rolling member is a ball.

7. A one-way clutch, comprising:
a passive member, with an outer circumferential surface, a top surface and a sliding portion having a first plane surface, not perpendicular to the top surface, and a second plane surface parallel thereto, wherein the first plane surface and the second plane surface extend to the interior of the passive member from the outer circumferential surface at an inclined angle;
an active member slidably disposed on the outer circumferential surface of the passive member and having an inner circumferential surface and an engaging portion, wherein the inner circumferential surface is in slidable contact with the outer circumferential surface of the passive member, and the engaging portion extends from the inner circumferential surface to the interior of the active member; and
a rolling member rolling and sliding between the sliding portion and the engaging portion, wherein the difference between the maximum distance from the engaging portion of the active member to the center of the passive member and the radius of the passive member is less than the diameter of the rolling member.

8. The one-way clutch as claimed in claim 7, wherein the engaging portion of the active member further comprises a curved surface and a slanted surface connected to the curved surface, the length of the curved surface is less than the length of the slanted surface, and the rolling member abuts the curved surface or slides on the slanted surface.

9. The one-way clutch as claimed in claim 7, wherein the engaging portion of the active member further comprises a first slanted surface and a second slanted surface connected to the first slanted surface, the length of the first slanted surface is less than the length of the second slanted surface, and the rolling member abuts the first slanted surface or slides on the second slanted surface.

10. The one-way clutch as claimed in claim 7, wherein the engaging portion of the active member further comprises a first curved surface and a second curved surface connected to the first curved surface, the length of the first curved surface is less than the length of the second curved surface, and the rolling member abuts the first curved surface or slides on the second curved surface.

11. The one-way clutch as claimed in claim 7, wherein the inclined angle is between 5° and 85°.

12. The one-way clutch as claimed in claim 7, wherein the rolling member is a ball.

* * * * *